United States Patent [19]

Audenaert et al.

[11] Patent Number: 5,910,557

[45] Date of Patent: Jun. 8, 1999

[54] FLUOROCHEMICAL POLYURETHANES, PROVIDING GOOD LAUNDRY AIR-DRY PERFORMANCE

[75] Inventors: Frans A. Audenaert, Kaprijke; Kathy E.M.L.A. Allewaert, Haacht; Gert Hooftman, Tielrode, all of Belgium; Makoto Nagase, Tokyo, Japan; Hugo R. Lens, Boechout, Belgium

[73] Assignee: Minnesota Mining and Manufacturing Company, St. Paul, Minn.

[21] Appl. No.: 08/855,803

[22] Filed: May 12, 1997

[30] Foreign Application Priority Data

May 17, 1996 [EP] European Pat. Off. ............. 96107909

[51] Int. Cl.$^6$ .................................................. C08G 18/62
[52] U.S. Cl. ............................. 528/70; 528/28; 528/45; 528/49; 528/75; 525/131; 524/591; 427/393.4; 428/423.1; 252/8.62
[58] Field of Search .................................. 528/75, 45, 49, 528/70, 28; 525/131; 524/591; 427/393.4; 428/423.1; 252/8.62

[56] References Cited

U.S. PATENT DOCUMENTS

| | | | |
|---|---|---|---|
| 2,803,615 | 8/1957 | Ahlbrecht et al. | 260/29.6 |
| 3,398,182 | 8/1968 | Guenthner et al. | 260/455 |
| 3,510,455 | 5/1970 | Olson | 260/67.6 |
| 3,574,791 | 4/1971 | Sherman et al. | 260/884 |
| 3,758,447 | 9/1973 | Falk et al. | 260/78.5 B |
| 4,098,742 | 7/1978 | Mueller | 260/29.2 M |
| 4,788,287 | 11/1988 | Matsuo et al. | 544/196 |
| 4,792,354 | 12/1988 | Matsuo et al. | 106/2 |
| 5,019,428 | 5/1991 | Ludemann et al. | 427/387 |
| 5,057,377 | 10/1991 | Karydas et al. | 428/447 |
| 5,185,421 | 2/1993 | Cohen et al. | 528/70 |
| 5,258,458 | 11/1993 | Allewaert et al. | 525/104 |
| 5,260,400 | 11/1993 | Karydas | 528/25 |
| 5,276,175 | 1/1994 | Dams et al. | 560/27 |
| 5,344,903 | 9/1994 | Raiford et al. | 526/245 |
| 5,350,795 | 9/1994 | Smith et al. | 524/507 |
| 5,453,540 | 9/1995 | Dams et al. | 564/96 |
| 5,491,261 | 2/1996 | Haniff et al. | 562/582 |

FOREIGN PATENT DOCUMENTS

| | | |
|---|---|---|
| 0 383 310 A2 | 8/1990 | European Pat. Off. . |
| 0 526 976 | 2/1993 | European Pat. Off. . |

OTHER PUBLICATIONS

Banks, Ed., Organofluorine Chemicals and Their Industrial Applications, Ellis Horwood Ltd., Chichester, England, 1979, pp. 226–234.

EPO Search Report for EP 96107909.2, Nov. 4, 1996.

*Primary Examiner*—Rachel Gorr
*Attorney, Agent, or Firm*—Eloise J. Maki

[57] ABSTRACT

The present invention relates to fluorochemical polyurethane compounds of the formula (I) according to claim 1, a method for their preparation and to compositions comprising that fluorochemical polyurethane compound. The compound and the composition comprising that compound are suitable to impart durable oil- and water-repellency and good laundry air-dry performance to substrates, such as fibers, woven or non-woven fabrics, carpets, leather and paper.

61 Claims, No Drawings

FLUOROCHEMICAL POLYURETHANES, PROVIDING GOOD LAUNDRY AIR-DRY PERFORMANCE

FIELD OF THE INVENTION

This invention relates to oil- and water-repellent fluorochemical compositions comprising fluorochemical polyurethanes derived from functionalized fluorochemical oligomers and isocyanates. This invention, in another aspect, relates to a method for imparting oil- and water-repellent properties to fibrous substrates and other materials and to the resulting treated substrates.

BACKGROUND OF THE INVENTION

The use of various fluorochemical compositions on fibers and fibrous substrates, such as textiles, paper and leather, to impart oil- and water-repellency is known. See for example, Banks, Ed., *Organofluorine Chemicals and Their Industrial Applications*, Ellis Horwood Ltd., Chichester, England, 1979, pp. 226–234.

Certain fluorinated compounds containing urethane bonds are known. A common synthetic route for forming such compounds containing urethane bonds uses isocyanate compounds as starting materials. The use of blocking or masking agents to 'protect' the unreacted isocyanate moieties is also known.

U.S. Pat. No. 3,398,182 teaches fluorocarbon compounds which contain a highly fluorinated oleophobic and hydrophobic terminal portion and a different nonfluorinated oleophilic portion linked together by a urethane radical obtained by reacting together an isocyanate and a highly fluorinated organic compound containing an active hydrogen. Surfaces coated with such fluorocarbon compounds are oleophobic and hydrophobic and the coating is durable, resisting removal by abrasion.

U.S. Pat. No. 4,788,287 and U.S. Pat. No. 4,792,354 disclose a water and oil repellent compound having at least two terminal segments and an intermediate segment connecting the terminal segments and having a molecular weight of from 800 to 20,000, each terminal segment containing at least one polyfluoroalkyl group connected by a —CONH— linking group, the intermediate segment being a urethane oligomer containing at least two —CONH— linking groups in one molecule, and said terminal segments and intermediate segment being connected by a —CONH— linking group. The urethane oligomer of U.S. Pat. No. 4,792,354 further contains a hydrophilic molecular chain.

U.S. Pat. Nos. 5,276,175 and 5,453,540 teach fluorochemical compositions comprising fluorinated compounds, wherein the fluorinated compound comprises a fluorochemical oligomeric portion, an organic moiety, and a group that can impart soft hand, stain release, water repellency, or a durable property when the compound is applied to a fibrous substrate, wherein the fluorochemical oligomeric portion is bonded to the organic moiety through an isocyanate-derived linking group.

U.S. Pat. Nos. 5,276,175 and 5,453,540 disclose fluorochemical compositions comprising fluorinated compounds, wherein the fluorinated compound comprises a fluorochemical oligomeric portion, an organic moiety, and a group that can impart soft hand, stain release, water-repellency, or a durable property when the compound is applied to a fibrous substrate, wherein the fluorochemical oligomeric portion is bonded to the organic moieties through an isocyanate-derived linking group. These fluorochemical compounds, however, are not polyurethanes in the sense of the present invention, because the patents teach that, if a reagent containing two or more functional groups reactive to an isocyanate is used to prepare the compound, at least one of the functional groups will have a substantially lesser degree of reactivity with isocyanates than the others and the less reactive group will generally remain unreacted; see U.S. Patent No. 5,276,175, column 22, lines 27–35, and U.S. Pat. No. 5,453,540, column 20, lines 58–66.

U.S. Pat. No. 5,491,261 discloses di-, tri- and polyperfluoroalkyl-substituted alcohols and acids and derivatives thereof which are prepared from perfluoroalkyl iodides and di-, tri- or polyallyl alcohols or acids. They can be reacted with isocyanates, epoxy compounds, anhydrides, acids or acid derivatives to prepare a great variety of oil- and water-repellent compositions.

The inclusion of silicone moieties in treatments with fluorochemicals which provide oil- and water-repellency is known to improve the feel or 'hand' of the treated substrates.

U.S. Pat. No. 5,260,400 relates to silicone and perfluoroalkyl group containing telomers useful as coatings on glass, paper, wood, leather and especially textiles.

U.S. Pat. No. 4,098,742 teaches polyurethanes which contain at least one segment derived from a perfluoroalkyl-substituted diol and at least one segment derived from a reactive-hydrogen-containing polysiloxane, which are synthesized by co-polycondensation with an organic diisocyanate.

U.S. Pat. No. 5,258,458 discloses a composition for treating fibrous substrates such as textiles to provide oil and water repellency. The composition comprises a) a terpolymer comprising randomly distributed i) units containing a fluoroaliphatic group, Rf, ii) fluorine-free hydrocarbon units, and iii) units containing silicone and b) a fluorine-containing polymer having isocyanate derived linking groups and blocked isocyanate moieties.

European Patent Publication 0 383 310 A2 teaches a water and oil repellent containing a copolymer of a first vinyl monomer having a perfluoroalkyl group, a second vinyl monomer having a polyorganosiloxane chain and a third vinyl monomer having an isocyanate group or blocked isocyanate group as essential components. As an alternative, a water and oil repellent contains a copolymer of a first vinyl monomer having a polyorganosiloxane chain and a second vinyl monomer having an isocyanate group or blocked isocyanate group, in combination with a water and oil repellent compound having a perfluoroalkyl group.

U.S. Pat. No. 5,019,428 teaches that modified polyurethanes containing perfluoroaliphatic groups which are obtained by reacting oligo(poly)urethanes containing free hydroxyl or isocyanate groups and perfluoroaliphatic groups with di/polyfunctional polysiloxanes at elevated temperatures with conversion of all the reactive groups of the urethane are used for the oil- and water-repellent finishing of fiber materials.

Environmental and safety concerns nowadays require the majority of all repellent treatment applications to be made from aqueous formulations in place of organic solvents. Practically all of the known compositions which can be applied from an aqueous emulsion require a heat-curing step after application and drying.

U.S. Pat. No. 5,344,903 teaches that lower homologue perfluoroalkylethyl (meth)acrylates copolymerized with vinylidene chloride and alkyl (meth)acrylates; optionally with N-methylolacrylamide, hydroxyalkyl (meth)acrylates, and/or akloxy(meth)acrylates impart high levels of water-, alcohol- and oil-repellency to fabrics under mild conditions.

U.S. Pat. No. 5,350,795 discloses fluorochemical compositions for treating textile fibers and fabrics to impart oil and water repellency without thermal treatment. The compositions comprise an aqueous, substantially organic solvent free, solution or dispersion of (a) a fluorochemical acrylate copolymer comprised of a fluorinated acrylate monomer, polyalkylene glycol acrylate or methacrylate, and polyalkylene glycol diacrylate or dimethacrylate; and (b) a polyalkoxylated polyurethane having pendant perfluoroalkyl groups comprised of an aliphatic or aromatic tri- or higher order isocyanate, a fluorinated alcohol, amine or mercaptan, and a poly(oxyalkylene)diol or dithiol.

Although water- and oil-repellent treating agents are readily available, it is very difficult to combine high initial oil- and water-repellency with excellent laundering and dry-clean durability. Furthermore, many high performance fluorochemicals have a tendency to impart a harsh feeling to the treated fabric. Although silicones can be applied to overcome this problem, silicones are usually not compatible with the fluorochemicals and therefore, the treated substrates typically will show a decrease in water and especially oil repellency.

Although existing patents claim durable repellent compositions, resistant to laundering and dry cleaning, they virtually all require a heat treatment after home launderings in order to regain the repellent properties. In known textile treatments, especially the dynamic water repellency is completely lost without heat treatment.

SUMMARY OF THE INVENTION

The present invention provides fluorochemical polyurethane compounds exhibiting high initial and durable oil- and water-repellent properties. It also provides a method of preparing such fluorochemical polyurethane compounds. It further provides a composition comprising a fluorochemical polyurethane compound which is suitable to impart durable oil- and water-repellency to a substrate treated therewith. The composition of the present invention should furthermore provide good laundry air-dry performance, i.e., durable repellent properties after home launderings without a heat treatment step required. In addition, the composition of the present invention should be curable at low temperatures.

DETAILED DESCRIPTION OF THE INVENTION

The fluorochemical polyurethane compound useful in this invention can be prepared by reacting:

(a) a fluorochemical oligomer comprising the oligomerization product of fluorochemical monomers alone or in combination with fluorine-free monomers, in the presence of at least one functionalized chain transfer agent (b) a di-, tri-, or tetravalent isocyanate or combinations thereof, (c) at least one difunctional chain extender, and (d) at least one blocking or masking group.

A first subject-matter of the present invention is thus a fluorochemical polyurethane compound represented by formula (I)

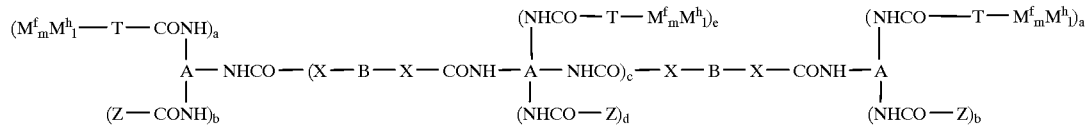

(I)

wherein:

$M^f_m M^h_l$ is a fluorochemical oligomer, comprising m units derived from a fluorochemical monomer and l units derived from a fluorine-free monomer, wherein the fluorochemical monomers and the fluorine-free monomers may be the same or different;

m is a number from 2 to 40, inclusive;

l is a number from 0 to 20, inclusive;

T is an organic linking group obtained by removing a hydrogen atom from a chain transfer agent, and the T residues may be the same or may be different;

Z is the residue obtained by removing a hydrogen atom from an organic masking or blocking group, and the Z residues may be the same or may be different;

A is a di- tri- or tetravalent residue obtained by removing 2, 3 or 4 -NCO groups from a corresponding isocyanate, and the A residues may be the same or may be different;

B is a divalent organic residue obtained by removing the two X—H groups from a difunctional active hydrogen compound HX-B-XH, wherein X is O, NH or S, and the B residues may be the same or may be different;

a is a number from 1 to 3, inclusive and b is a number from 0 to 2, inclusive, with the proviso that a+b has a value from 1 to 3;

c is a number from 0 to 30 inclusive;

d and e are numbers from 0 to 2, inclusive, provided that d+e is not greater than 2.

Another subject-matter of the present invention is a method of preparing a fluorochemical polyurethane compound of formula (I) which comprises reacting a fluorochemical oligomer of the formula (III)

$M^f_m M^h_l$-TH (III)

wherein $M^f_m M^h_l$ and T are defined as above, with at least one isocyanate of formula (IV)

$$A(NCO)_x \quad (IV)$$

wherein A is defined as above and x is a number from 2 to 4, inclusive, at least one bifunctional active hydrogen compound of formula (V)

$$HX\text{-}B\text{-}XH \quad (V)$$

wherein X and B are defined as above,
and at least one compound of formula (VI)

$$Z\text{-}H \quad (VI)$$

wherein Z is defined as above.

The fluorochemical polyurethane compound may be used in the form of a solution or dispersion and is generally employed as a composition comprising the said compound which composition constitutes a further subject-matter of the invention. The treatment provides strong initial repellency to substrates including textile fibers, such as cotton, polyester, polyamide or blends thereof, protective clothing made from aramid type fibers or polyvinyl chloride, fabrics such as apparel, upholstery and carpet, non-wovens, leather, paper, wood, metal, glass, concrete and stone, and displays a high durability to dry cleaning and home laundering. Even when treatment was carried out at low cure conditions, the treatment composition using the fluorochemical polyurethane compound of the present invention provides especially good oil- and water-repellency after multiple launderings even without heating the substrate after laundering. This special feature will be further referred to as laundry air-dry (LAD) effect or performance. It is also possible to include segments, e.g., polysiloxane segments, into the fluorochemical polyurethane compound of the present invention which in addition to durable oil- and water-repellency impart a gentle touch to the treated substrates.

Still another subject matter of the present invention is the use of a fluorochemical polyurethane compound or of a composition comprising said compound to impart durable oil- and water-repellency and good laundry air-dry performance to a substrate treated therewith. Said treatment comprises the steps of (1) applying to the surface of a substrate an amount of the fluorochemical polyurethane compound of the invention or of a composition comprising said compound, effective to impart oil- and water-repellent properties to the substrate, wherein said compound is present in an amount of 0.01% to 5% by weight based on the weight of the substrate, and (2) heating the treated substrate from step 1 at a temperature and for a time sufficient to cure the treated substrate.

The compounds of the present invention represented by the formula (I) are polyurethanes, i.e., they comprise at least one polymeric portion within their molecule which is obtained by the reaction of isocyanate group-containing compounds with a chain extender having two isocyanate reactive X—H groups. The moiety derived from the chain extender is represented in the formula (I) by the residue -X-B-X-. These fluorochemical polyurethane compounds exhibit the surprising ability to impart not only high initial oil- and water-repellency to treated substrates but also durable repellency which does not disappear after repeated launderings and—what is most surprising—good laundry air-dry performance which means that it is not necessary to heat, e.g., iron, the substrate after laundering to reestablish repellency. Drying of the substrate in the air is sufficient to regenerate good oil- and water-repellent properties.

The fluorochemical polyurethane compounds of the present invention exhibit superior laundry air-dry characteristics as compared with the compositions disclosed in U.S. Pat. Nos. 5,276,175 and 5,453,540.

The fluorochemical polyurethane compounds of the present invention can be prepared in a two step reaction. In a first step, a functionalized fluorochemical oligomer is prepared, which in a second step is further reacted to form a polyurethane.

In a first step, a fluorochemical oligomer is conveniently prepared by free-radical oligomerization of fluorochemical monomers ($R_f$-Q-D) alone or in combination with hydrocarbon monomers ($R_h$-D'), in the presence of hydroxy-, amino-, or mercapto functionalized chain transfer agents. The aliphatic backbone of the fluorochemical oligomeric portion comprises a sufficient number of polymerized units to render the portion oligomeric. The aliphatic backbone preferably comprises from 2 to about 40 polymerized units derived from fluorochemical monomers and from 0 to about 20 polymerized units derived from hydrocarbon monomers.

The fluoroaliphatic radical, $R_f$, in the fluorochemical monomer, is a fluorinated, stable, inert, preferably saturated, non-polar, monovalent aliphatic radical. It can be straight chain, branched chain, or cyclic or combinations thereof It can contain heteroatoms such as oxygen, divalent or hexavalent sulfur, or nitrogen. $R_f$ is preferably a fully-fluorinated radical, but hydrogen or chlorine atoms can be present as substituents if not more than one atom of either is present for every two carbon atoms. The $R_f$ radical has at least 3 and up to 18 carbon atoms, preferably 3 to 14, especially 6 to 12 carbon atoms, and preferably contains about 40% to about 80% fluorine by weight, more preferably about 50% to about 78% fluorine by weight. The terminal portion of the $R_f$ radical is a perfluorinated moiety, which will preferably contain at least 7 fluorine atoms, e.g., $CF_3CF_2CF_2$—, $(CF_3)_2CF$—, $F_5SCF_2$—. The preferred $R_f$ radicals are fully or substantially fluorinated and are preferably those perfluorinated aliphatic radicals of the formula $C_nF_{2n+1}$— where n is 3 to 18.

The linking group Q links the fluoroaliphatic group $R_f$ to the ethylenically unsaturated alkylene segment D. Linking group Q preferably contains from 1 to about 20 carbon atoms. Q can optionally contain oxygen, nitrogen, or sulfur-containing groups or a combination thereof, and Q is preferably free of functional groups that substantially interfere with free-radical oligomerization (e.g., polymerizable olefinic double bonds, thiols, easily abstracted hydrogen atoms such as cumyl hydrogens, and other such functionality known to those skilled in the art). Examples of suitable linking groups Q include straight chain, branched chain or cyclic alkylene, arylene, aralkylene, oxy, oxo, hydroxy, thio, sulfonyl, sulfoxy, amino, imino, sulfonamido, carboxyarnido, carbonyloxy, urethanylene, ureylene, and combinations thereof such as sulfonamidoalkylene. Preferred linking groups comprise groups of the formula

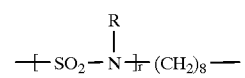

wherein R is methyl or ethyl; r is 0 or 1 and s is 1 to 8, preferably 1 or 2. Especially preferred linking groups include —$(CH_2CH_2)_k$— and —$SO_2N(R)CH_2CH_2$— wherein k is 1 or 2 and R is defined as above.

$R_h$ is a fluorine-free organic group.

D and D' contain an ethylenically unsaturated segment capable of copolymerization with itself or each other. Suitable segments include, for example, moieties derived from vinyl ethers, vinyl esters, allyl esters, vinyl ketones, styrene, vinyl amide, acrylamides, maleates, fumarates, acrylates and methacrylates. Of these, the esters of alpha,beta unsaturated acids, such as the acrylates and methacrylates are preferred.

One particularly preferred fluorochemical monomer for use in the present invention can be represented by the following formula, wherein the fluorochemical oligomer is derived from a fluorochemical: monomer of the formula (II):

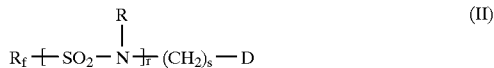

wherein $R_f$ is $C_nF_{2n+1}$ with n being 3 to 18, preferably 6 to 12;

r is 0 or 1;

s is 1 to 8, preferably 1 or 2;

D is a group comprising a radically polymerizable unsaturated residue; and

R is methyl or ethyl.

Fluorochemical monomers $R_f$-Q-D as described above and methods for the preparation thereof are known and disclosed, e.g., in U.S. Pat. No. 2,803,615. Examples of such compounds include general classes of fluorochemical acrylates, methacrylates, vinyl ethers, and allyl compounds containing fluorinated sulfonamido groups, acrylates or methacrylates derived from fluorochemical telomer alcohols, acrylates or methacrylates derived from fluorochemical carboxylic acids, and perfluoroalkyl acrylates or methacrylates as disclosed in EP-A-526 976.

Preferred examples of fluorochemical monomers include:

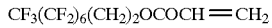

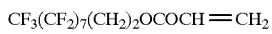

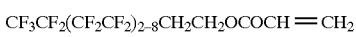

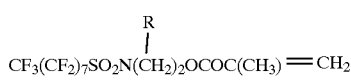

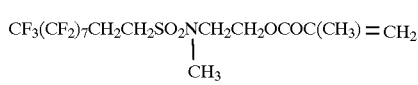

R = methyl or ethyl.

Hydrocarbon monomers $R_h$-D' suitable for the preparation of the fluorochemical oligomers are also well known and generally commercially available. Examples of such compounds include general classes of ethylenic compounds capable of free-radical polymerization, such as, for example, allyl esters such as allyl acetate and allyl heptanoate; alkyl vinyl ethers or alkyl allyl ethers such as cetyl vinyl ether, dodecylvinyl ether, 2-chloroethylvinyl ether, ethylvinyl ether; unsaturated acids such as acrylic acid, methacrylic acid, alpha-chloro acrylic acid, crotonic acid, maleic acid, fumaric acid, itaconic acid and their anhydrides and their esters such as vinyl, allyl, methyl, butyl, isobutyl, hexyl, heptyl, 2-ethyl-hexyl, cyclohexyl, lauryl, stearyl, isobornyl or alkoxy ethyl acrylates and methacrylates; alpha-beta unsaturated nitriles such as acrylonitrile, methacrylonitrile, 2-chloroacrylonitrile, 2-cyanoethyl acrylate, alkyl cyanoacrylates; alpha,beta-unsaturated carboxylic acid derivatives such as allyl alcohol, allyl glycolate, acrylamide, methacrylamide, n-diisopropyl acrylanide, diacetoneacrylamide, N,N-diethylaminoethylmethacrylate, N-t-butylamino ethyl methacrylate; styrene and its derivatives such as vinyltoluene, alpha-methyistyrene, alpha-cyanomethyl styrene; lower olefinic hydrocarbons which can contain halogen such as ethylene, propylene, isobutene, 3-chloro-1-isobutene, butadiene, isoprene, chloro and dichiorobutadiene and 2,5-dimethyl-1,5-hexadiene, and allyl or vinyl halides such as vinyl and vinylidene chloride. Preferred co-monomers which can be copolymerized with the above-described fluoroaliphatic radical-containing monomers include those selected from octadecylmethacrylate, 1,4-butanediol diacrylate, laurylmethacrylate, butylacrylate, N-methylol acrylamide, isobutylmethacrylate, ethylhexyl acrylate, ethylhexyl methacrylate, vinylciloride and vinylidene chloride.

The hydroxy-, amino and/or mercapto functionalized chain transfer agents T-H useful in the preparation of the fluorochemical oligomer include those selected from 2-mercaptoethanol, 3-mercapto-2-butanol, 3-mercapto-2-propanol, 3-mercapto-1-propanol, 3-mercapto-1,2-propanediol, 2,3-dimercaptopropanol, 2-mercaptoethylamine and 2-mercaptoethylsulfide. A single compound or a mixture of different chain transfer agents may be used. The chain transfer agents which are preferably used in the preparation of the fluorochemical oligomer contain only two functional groups so that after reaction with the oligomer only one isocyanate reactive group remains on the obtained fluorochemical oligomer. The preferred chain transfer agent is 2-mercaptoethanol.

In order to prepare the functionalized fluorochemical oligomer, a free-radical initiator is present. Such free-radical initiators are known in the art and include azo compounds, such as azobisisobutyronitrile (AIBN) and azo-2-cyanovaleric acid and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide.

In a second step of the reaction, the fluorochemical oligomer is reacted with an isocyanate, a chain extender and a blocking or masking agent. Suitable isocyanates $A(NCO)_x$, with x being 2, 3 or 4, for use in preparing the fluorochemical polyurethanes of formula I include aromatic diisocyanates such as 4,4'-methylene-diphenylene diisocyanate (MDI) and 2,4-toluene diisocyanate (2,4-TDI); alicyclic diisocyanates such as 3-isocyanatomethyl-3,5,5-trimethyl-cyclohexyl isocyanate (IPDI), 1,4-cyclohexane diisocyanate and 4,4'-cyclohexylmethane diisocyanate; aliphatic diisocyanates such as methylene diisocyanate, 1,6-hexamethylene diisocyanate, 2,2,4-trimethyl-1,6-hexamethylene diisocyanate, and 1,2-ethylene diisocyanate; aliphatic triisocyanates such as 1,3,6-hexamethylenetriisocyanate; aromatic triisocyanates, such as 4,4',4"-triphenylmethane triisocyanate; polyisocyanates such as polymethylene-polyphenyl-isocyanate (PAPI); isocyanurates, such as the trimer of hexamethylenediisocyanate and the trimer of IPDI and mixtures thereof.

In the preparation of the fluorochemical polyurethane compounds of the invention it is preferred that not only difunctional isocyanates, i.e., isocyanates A(NCO)$_2$, are used, but that at least some higher functional, e.g., trifunctional isocyanate is employed.

This means that the fluorochemical polyurethane compounds of the invention are preferably not just linear compounds obtained from diisocyanates but contain at least some sites of branching due to the inclusion of tri- or tetraisocyanates. More preferably, at least about 50%, most preferably more than 90% of the isocyanates employed are triisocyanates.

Difunctional chain extenders HX-B-XH suitable in the formation of the fluorochemical polyurethane compounds of the invention include difunctional alcohols, thiols and amines. A single compound or a mixture of different chain extenders may be used. Examples include diols such as 1,4-butanediol, 1,6-hexanediol, 1–10-decanediol, 4,4'-isopropylidene diphenol (Bisphenol A); polyester diols, such as polycaprolactone diol, fatty acid dimer diols and poly(oxy)alkylenediols with an oxyalkylene group having 2 to 4 carbon atoms, such as —OCH$_2$CH$_2$—, —O(CH$_2$)$_4$—, —OCH$_2$CH$_2$CH$_2$—, —OCH(CH$_3$)CH$_2$— and —OCH(CH$_3$)CH(CH$_3$)— (preferably the oxyalkylene units in said poly(oxyalkylene) being the same, as in polypropyleneglycol or present as a mixture). In a preferred embodiment the group B comprises siloxane groups, such as dimethylsiloxane groups, which impart soft hand to the substrate treated with the fluorochemical polyurethane. Furthermore, the group B may be partially fluorinated in order to enhance the oil- and water-repellent characteristics of the compound.

Conventional isocyanate masking or blocking agents include alcohols such as methanol, ethanol, n-propyl alcohol, isopropyl alcohol, n-butyl alcohol, isobutyl alcohol, t-butyl alcohol, n-amyl alcohol, t-amyl alcohol, 2-ethylhexanol, glycidol, (iso)stearylalcohol; aryl alcohols (e.g., phenols, cresols, nitrophenols, o- and p-chlorophenol, napthols, 4-hydroxybiphenyl); C$_2$ to C$_8$ alkanone oximes (e.g., acetone oxime, butanone oxime); benzophenone oxime; aryl-thiols (e.g., thiophenol); organic carbanion active hydrogen compounds (e.g., diethyl malonate, acetylacetone, ethyl acetoacetate, ethylcyanoacetate); epsilon-caprolactone; primary or secondary amines (e.g., butyl amine); hydroxylamine; primary amino mercaptans and secondary amino mercaptans. A single compound or a mixture of different masking or blocking agents may be used. Particularly preferred blocking or masking agents include C$_2$ to C$_8$ alkanone oximes, e.g., 2-butanone oxime, monofunctional alcohols such as 2-ethylhexanol and (iso)stearylalcohol.

Step 2 is carried out under conventional urethane forming conditions. The reaction is carried out under dry conditions preferably in a polar solvent such as ethyl acetate, acetone, methyl ethyl ketone and methyl isobutyl ketone. Preferably the reaction is run in the presence of a catalyst. Preferred catalysts include tin salts such as dibutyltin dilaurate and stannous octoate. Suitable reaction temperatures will be readily determined by those skilled in the art based on the particular reagents, solvent, and catalysts being used.

The fluorochemical polyurethane compound of this invention can be applied using conventional application methods and can be used as an aqueous dispersion or alternatively it can be used as a treatment composition in a solvent. A dispersion will generally contain water, an amount of compound effective to provide repellent properties to a substrate treated therewith, and a surfactant in an amount effective to stabilize the dispersion. Water is preferably present in an amount of about 70 to about 20000 parts by weight based on 100 parts by weight of the compound of the invention. The surfactant is preferably present in an amount of about 1 to about 25 parts by weight, preferably about 5 to about 10 parts by weight, based on 100 parts by weight of the composition of the invention. Conventional cationic, nonionic, anionic, and zwitterionic surfactants are suitable. Preferred surfactants are ammonium surfactants (used alone or as mixtures with nonionic surfactants) having two long chain alkyl groups which can be represented by the general formula (VII):

(VII)

wherein:
R$_1$ and R$^3$ each and independently are long chain alkyl groups containing at least eight carbon atoms, preferably from 8 to 24 carbon atoms or benzyl groups.
R$^3$ and R$^4$ each and independently are short chain alkyl groups having from 1 to 8 carbon atoms or hydrogen.
X$^{'-}$ is an anion, preferably halogen (Cl–, Br$^{-,'-}$), HSO$_4^-$, CH$_3$COO$^-$. Surprisingly, it has been found that the use of said ammonium surfactants enhances the durability of the oil and water repellent properties and the LAD effect of the fluorochemical polyurethane compounds of the invention.

The amount of the treating composition applied to a substrate in accordance with this invention is chosen so that sufficiently high or desirable water and oil repellencies are imparted to the substrate surface, said amount usually being such that 0.01% to 5% by weight, preferably 0.05% to 2% by weight, based on the weight of the substrate, of fluorochemical treating agent is present on the treated substrate. The amount which is sufficient to impart desired repellency can be determined empirically and can be increased as necessary or desired. In order to treat a substrate, the substrate can be immersed in the dispersion and agitated until it is saturated. The saturated substrate can then be run through a padder/roller to remove excess dispersion, dried in an oven at a relatively low temperature (e.g., 70° C.) for a time sufficient to remove the dispersion medium (e.g., water, ethylene glycol, or a mixture thereof, and cured at a temperature and for a time sufficient to provide a cured treated substrate. This curing process can be carried out at temperatures between about 70° C. and about 190° C. depending on the particular system or application method used. In general, a temperature of about 170° C. for a period of about 20 seconds to 3 minutes, preferably 1 to 2 minutes, is suitable. The cured treated substrate can be used as desired, e.g., incorporated or fashioned into a garment.

In order to improve fixing of the composition of the invention to a substrate, it is sometimes advantageous to include in the dispersion certain additives, polymers, thermo-condensable products and catalysts capable of promoting interaction with the substrate. Among these are the condensates or precondensates of urea or melamine with formaldehyde and glyoxal resins. Particular suitable additives and amounts thereof can be selected by those skilled in the art.

The substrates treated by the water and oil repellency imparting composition of this invention are not especially limited and include, e.g., textile fibers, fabrics, non-wovens, leather, paper, carpet, plastic, wood, metal, glass, concrete and stone. Preferred are fibers, woven or non-woven fabrics, carpets, leather and paper.

Objects and advantages of this invention are further illustrated by the following examples, but the particular materials and amounts thereof recited in these examples, as well as other conditions and details, should not be construed to unduly limit this invention.

EXAMPLES

Formulation and Treatment Procedure

Treatment baths were formulated containing a defined amount of the fluorochemical treatment agent. Treatments were applied to the test substrates by padding to provide a concentration of 0.3% solids (based on fabric weight and indicated as SOF (solids on fabric)) and drying and curing at 170° C. for 1.5 minutes unless otherwise indicated. Substrates used for the evaluation of treatments of this invention are all commercially available and are listed below:

PES/CO: Grey polyester/cotton 65/35, style No. 2681, obtained from Utexbel N.V., Ronse, Belgium 100% CO: bleached, mercerized cotton poplin, style No. 2286, obtained from Utexbel N.V., Ronse, Belgium 100% PAM: Polyamide microfiber, style No. 7819, obtained from Sofinal, Belgium 100% PES: Polyester microfiber, style No. 6145, obtained from Sofinal, Belgium Acrylic Awning: Available from Dixon Constant, Wasquehal, France.

Respective data of water and oil repellency shown in the following Examples and Comparative Examples are based on the following methods of measurement and evaluation criteria:

Bundesmann Test

The impregnating effect of rain on treated substrates is determined using the Bundesmann Test Method (DIN 53888).

In this test, the treated substrates are subjected to a simulated rainfall, while the back of the substrate is being rubbed. The appearance of the upper exposed surface is checked visually after 1, 5 and 10 minutes and is given a rating between 1 (complete surface wetting) and 5 (no water remains on the surface). Besides the observation of the wetting pattern also the water absorption (%/ ABS) can be quantitatively measured. Well treated samples give low absorption results.

Spray Rating (SR)

The spray rating of a treated substrate is a value indicative of the dynamic repellency of the treated substrate to water that impinges on the treated substrate. The repellency is measured by Standard Test Number 22, published in the 1985 Technical Manual and Yearbook of the American Association of Textile Chemists and Colorists (AATCC), and is expressed in terms of 'spray rating' of the tested substrate. The spray rating is obtained by spraying 250 ml water on the substrate from a height of 15 cm. The wetting pattern is visually rated: using a 0 to 100 scale, where 0 means complete wetting and 100 means no wetting at all.

Oil Repellency (OR)

The oil repellency of a treated substrate is measured by the American Association of Textile Chemists and Colorists (AATCC) Standard Test Method No. 118-1983, which test is based on the resistance of a treated substrate to penetration by oils of varying surface tensions. Treated substrates resistant only to Nujol® mineral oil (the least penetrating of the test oils) are given a rating of 1, whereas treated substrates resistant to heptane (the most penetrating of the test oils) are given a rating of 8. Other intermediate values are determined by use of other pure oils or mixtures of oils, as shown in the following table.

| Standard Test Liquids | |
|---|---|
| AATCC Oil Repellency Rating Number | Compositions |
| 1 | Nujol ® mineral oil |
| 2 | Nujol ®/n-hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Laundering Procedure

The procedure set forth below was used to prepare treated substrate samples designated in the examples below as "5 Home Launderings (5HL)".

A 230 g sample of generally square, 400 $cm^2$ to about 900 $cm^2$ sheets of treated substrate was placed in a washing machine along with a ballast sample (1.9 kg of 8 oz fabric in the form of generally square, hemmed 8100 $cm^2$ sheets). A commercial detergent ("Sapton", available from Henkel, German, 46 g) is added and the washer is filled to high water level with hot water (40° C.+/−3° C.). The substrate and ballast load is washed five times using a 12-minute normal wash cycle followed by five rinse cycles and centrifuging. The samples are not dried between repeat cycles.

Air-dry Procedure: The substrate is hung on a support means and dried at room temperature (about 20° C.) during 24 hours.

Ironing cycle: After drying, the samples are pressed using an iron with the temperature set for the fiber of the substrate.

The laundering procedure was followed by performance tests such as the Water Spray Test (SR and % absorption) and the Oil Repellency Test (OR).

Dry Clean Procedure

The ability of a substrate treated with a compound of this invention to continue performing its function after being subjected to dry cleaning was determined using a modification of "3M Laboratory Dry Cleaning Procedure I", Scotchgard® Protector, 3M Test Methods, Oct. 1, 1988. Five dry cleanings were carried out without detergent (indicated as 5DC). This was followed by performance tests such as the Water Spray Test (SR) or the OIL Repellency Test (OR) described above.

Spot Cleaning Air-Dry Test

Treated fabrics were tested for their ability to withstand home spot cleaning. For this test, the fabric was first rubbed with soap (55% "Dreft" detergent, available from Procter and Gamble) after which the fabric was given one rinse cycle in a home laundering machine. After the fabric was dried at room temperature for 24 hours, performance tests such as the Oil Repellency Test (OR) and Water Spray test (SR) described above were done.

Evaluation of Fabric "Hand" or Softness

Treated fabrics were rated for their "hand", i.e., their softness, smoothness, pliability and fluffiness to the touch, as this feature is important for the comfort and aesthetic appeal of repellent textile substrates. A scale of 10 to 1 was used, where a rating of 10 was given to those treatments which left the fabric the softest, while a rating of 1 was given to those treatments which gave the fabric the harshest hand (i.e., provided a rough, stiff, cardboard-like feel). The ratings in between were assigned to intermediate hand values. The ratings were an average of the evaluation by a test panel (8–10 persons).

Abbreviations

The following abbreviations and trade names are used in the examples:

MEKO: methyl ethyl ketoxime or 2-butanone oxime

Arcol® P1004: polypropylene glycol (Mw 430), available from Arco Chemical Industries Bisphenol A: 4,4'-isopropylidene diphenol BuFOSEMA: N-butyl perfluorooctyl sulfonamidoethyl (meth)acrylate MeFOSEMA: N-methyl perfluorooctyl sulfonamidoethyl (meth)acrylate EtFOSBA: N-methyl perfluorooctyl sulfonamidobutyl acrylate EtFOSE: N-ethyl perfluorooctyl sulfonamidoethanol EHMA: ethylhexyl methacrylate N-MAM: $HOCH_2NHC(O)CH=CH_2$ (48wt % aqueous solution)

Voranate™ M220 or PAPI: polymethylene polyphenyl isocyanate, available from Dow Chemical, Terneuzen, The Netherlands Ethoquad™ HT-25: trimethyl polyoxyethylene (15) hydrogenated tallow ammonium chloride, available from Akzo, Littleborough, UK Arquad™ T-50: tallow trimethyl ammoniumchloride, available from Akzo, Littleborough, UK Arquad™ 2HT-75: dimethyl-dihydrogenated tallow ammonium chloride; available from Akzo, Littleborough, UK Atpol™ E5721: alkylethyoxylate, available from ICI, Wilton, UK Rewopon™ IM OA: imidazoline type surfactant, available from Rewo, Germany Ethomeen™ HT25: polyoxyethylene (15) hydrogenated tallow amine, available from Akzo, Littleborough, UK Varine™ C: imidazoline type surfactant, available from Sherex Chemical Co., Dublin, Ohio, USA Fluowet™ AC812: telomer-type fluorochemical acrylate $C_nF_{2n+1}$,—$CH_2CH_2OC(O)CH=CH_2$, available from Hoechst AG, Germany Telomer acrylate: $C_nF_{2n+1}$—$CH_2CH_2OC(O)CH=CH_2$ wherein n is 9.4

RSH: 2-mercaptoethanol

FCA: perfluorooctyl dihydroacrylate

FOMA: perfluorooctyl dihydromethacrylate

Si-acrylate: Shin-Etsu X-248201, available from Shin-Etsu Chemical Co., Tokyo, Japan Wacker IM11 and VP1610: alpha,omega-hydroxy organofunctional polydimethylsiloxanes, available from Wacker Chemie, Munchen, Germany ECF: electrochemical fluorination Terathane 650: polytetramethylene oxide, available from Dupont, USA i-BMA: isobutylmethacrylate ODA: octadecylacrylate $VCl_2$: vinylidene chloride All parts, ratios, percentages, etc., in the following examples and the rest of the specification, are by weight unless otherwise noted.

A. Synthesis of Intermediate Fluorochemical Oligomers

The fluorochemical oligomers listed in Table 1 were prepared according to the general procedure as described for the synthesis of MeFOSEA/2-mercaptoethanol 4/1 (FC-2).

A 3 l reaction flask, equipped with 2 reflux condensers, a mechanical Teflon polymer-coated blade stirrer, a thermometer, a nitrogen inlet and vacuo outlet, was charged with 2.4 moles MeFOSEA and 987 g ethylacetate. The mixture was heated to 40° C. until all fluorochemical monomer was dissolved. 0.6 moles 2-mercaptoethanol and 0.15%AIBN were added and the solution was heated to 80° C., while stirring at 160 rpm. The reaction was run under nitrogen atmosphere at 80° C. during 16 hours, after which more than 95% conversion was obtained.

Following the above described method, the different fluorochemical oligomers listed in Table 1 were synthesized.

TABLE 1

Composition of Fluorochemical Oligomers

| FC-Oligomer | Monomer Composition | Molar Ratio |
|---|---|---|
| FC-1 | MeFOSEA/RSH | 8/1 |
| FC-2 | MeFOSEA/RSH | 4/1 |
| FC-3 | FluowetAC812/RSH | 4/1 |
| FC-4 | Telomer acrylate/RSH | 4/1 |
| FC-5 | MeFOSEA/Telomer acrylate/RSH | 2/2/1 |
| FC-6 | MeFOSEA/ODA/RSH | 2/2/1 |
| FC-7 | MeFOSEMA/RSH | 4/1 |
| FC-8 | MeFOSEA/RSH | 2/1 |
| FC-9 | MeFOSEA/iBMA/RSH | 6/2/1 |
| FC-10 | BuFOSEA/RSH | 4/1 |
| FC-11 | EtFOSEA/RSH | 4/1 |
| FC-12 | EtFOSEMA/RSH | 4/1 |
| FC-13 | Fluowet AC812/iBMA/RSH | 3/1/1 |
| FC-14 | MeFOSEA/iBMA/RSH | 3/1/1 |
| FC-15 | FOA/RSH | 4/1 |
| FC-16 | MeFOSEA/ODA/$VCl_2$/RSH | 5/2/1/1 |
| FC-17 | Fluowet AC812/ODA/$VCl_2$RSH | 5/2/1/1 |
| FC-18 | FOMA/RSH | 4/1 |
| FC-19 | MeFOSBA/RSH | 4/1 |
| FC-20 | MeFOSEA/EHMA/RSH | 3/1/1 |
| FC-21 | MeFOSEA/Si-acrylate/RSH | 3.75/0.25/1 |
| FC-22 | MeFOSEA/HSCH$_2$(HS)CHCH$_2$OH | 8/1 |
| FC-23 | Fluowet AC812/RSH | 6/1 |
| FC-24 | Fluowet AC812/iBMA/RSH | 6/2/1 |
| FC-25 | Fluowet AC812/MeFOSEA/RSH | 3.2/0.8/1 |
| FC-26 | Fluowet AC812/MeFOSEA/RSH | 2.4/1.6/1 |

EXAMPLES 1–39

Synthesis of Fluorochemical Polyurethanes

The fluorochemical oligomers, prepared in step A, were further reacted with isocyanate derivatives, chain extenders and blocking agents according to the general method outlined below for the synthesis of PAPI/FC-2/Arcol P1004/MEKO 3/2/2/3 (FCU-1):

A 500 ml 3-necked flask was equipped with a Dean-Stark condenser, a mechanical Teflon polymer coated blade stirrer, a thermometer and a nitrogen inlet. Fluorochemical oligomer FC-2 (0.04 mole or 164.4 g of the 60% solution in ethylacetate, prepared in step A), Arcol polyol P1004 (0.04 mole) and 152 g ethylacetate were charged to the flask. 60 g Ethylacetate was azeotropically distilled off via the Dean-Stark condenser, so as to obtain a 40% solution (total solids). After cooling to 55° C., the Dean-Stark condenser was replaced by a normal reflux condenser. 0.06 moles PAPI was added as well as dibutyltindilaurate catalyst (0.025% on solids). The solution was gently heated to 75° C. After the reaction exotherm, the mixture was heated at 75° C. during 8 hours. The reaction mixture was cooled to 55° C. and methylethylketoxime (0.06 mole) was added gradually over 5 minutes. The reaction was completed under stirring for another hour at 75° C. The FTIR spectrum showed that all isocyanate absorptions had disappeared. The final product, a clear brownish solution at 75° C., became partly solid when cooled below 55° C.

Following the above described method, the different fluorochemical polyurethanes listed in Table 2 were prepared. In some cases more than one fluorochemical oligomer, more than one chain extender or more than one blocking or masking agent was used.

TABLE 2

Composition of Fluorochemical Polyurethanes (FCU)

| FCU-No. | Composition | Molar Ratio |
|---|---|---|
| FCU-1 | PAPI/FC-2/Arcol P1004/MEKO | 3/2/2/3 |
| FCU-2 | PAPI/FC-2/1,2-propanediol/MEKO | 3/2/2/3 |
| FCU-3 | PAPI/FC-2/2-glycerolmonostearate/MEKO | 3/2/2/3 |
| FCU-4 | PAPI/FC-2/2-ethyl(1,3)hexanediol/MEKO | 3/2/2/3 |
| FCU-5 | PAPI/FC-14/FC-13/Arcol P1004/MEKO | 3/1/1/2/3 |
| FCU-6 | PAPI/FC-1/Arcol P1004/MEKO/$C_8H_{17}OH$ | 4/2/3/3/1 |
| FCU-7 | PAPI/FC-20/Arcol P1004/MEKO | 3/2/2/3 |
| FCU-8 | PAPI/FC-21/Arcol P1004/MEKO | 3/2/2/3 |
| FCU-9 | PAPI/FC-2/Arcol P1004/MEKO/$C_{18}H_{37}OH$ | 5/3/4/3/1 |
| FCU-10 | PAPI/FC-1/Arcol P1004/MEKO/$C_{18}H_{37}OH$ | 5/2/4/3/2 |
| FCU-11 | PAPI/FC-1/Arcol P1004/MEKO/$C_8H_{17}OH$ | 5/2/4/3/2 |
| FCU-12 | PAPI/FC-1/Arcol P1004/MEKO | 5/2/4/5 |
| FCU-13 | PAPI/FC-15/Arcol P1004/MEKO/$C_{18}H_{37}OH$ | 3/2/2/2/1 |
| FCU-14 | PAPI/FC-18/Arcol P1004/MEKO | 3/2/2/3 |
| FCU-15 | PAPI/FC-17/Arcol P1004/MEKO/$C_{18}H_{37}OH$ | 3/1/2/3/1 |
| FCU-16 | PAPI/FC-2/Terathane 650/MEKO | 3/2/2/3 |
| FCU-17 | PAPI/FC-3/Terathane 650/MEKO | 3/2/2/3 |
| FCU-18 | PAPI/FC-3/Arcol P1004/MEKO | 3/2/2/3 |
| FCU-19 | PAPI/FC-3/Wacker IM11/MEKO | 3/2/2/3 |
| FCU-20 | PAPI/FC-17/Wacker IM11/MEKO/$C_{18}H_{37}OH$ | 3/1/2/3/1 |
| FCU-21 | PAPI/FC-16/Wacker IM11/MEKO/$C_{18}H_{37}OH$ | 3/1/2/3/1 |
| FCU-22 | PAPI/FC-2/Bisphenol A/MEKO/$C_{18}H_{37}OH$ | 3/2/2/2/1 |
| FCU-23 | PAPI/FC-3/Bisphenol A/MEKO/$C_{18}H_{37}OH$ | 3/2/2/2/1 |
| FCU-24 | PAPI/FC-4/Arcol P1004/MEKO | 3/2/2/3 |
| FCU-25 | PAPI/FC-1/Arcol P1004/$C_{18}H_{37}OH$/MEKO | 4/2/3/1/3 |
| FCU-26 | PAPI/FC-1/Arcol P1004/Wacker IM11/$C_{18}H_{37}OH$/MEKO | 4/2/1.5/1.5/1/3 |
| FCU-27 | PAPI/FC-4/Bisphenol A/MEKO | 3/2/2/3 |
| FCU-28 | PAPI/FC-4/Arcol P1004/MEKO | 3/2/2/3 |
| FCU-29 | PAPI/FC-7/Arcol P1004/MEKO | 3/2/2/3 |
| FCU-30 | PAPI/FC-10/Arcol P1004/MEKO | 3/2/2/3 |
| FCU-31 | PAPI/FC-11/Arcol P1004/MEKO | 3/2/2/3 |
| FCU-32 | PAPI/FC-12/Arcol P1004/MEKO | 3/2/2/3 |
| FCU-33 | PAPI/FC-9/Arcol P1004/MEKO/$C_{18}H_{37}OH$ | 3/1/2/3/1 |
| FCU-34 | PAPI/FC-14/Arcol P1004/MEKO | 3/2/2/3 |
| FCU-35 | PAPI/FC-2/Arcol P1004/$C_8H_{17}OH$ | 3/2/2/3 |
| FCU-36 | PAPI/FC-2/VP1610/MEKO | 3/2/2/3 |
| FCU-37 | PAPI/FC-2/Bisphenol A/MEKO | 3/2/2/3 |
| FCU-38 | PAPI/FC-4/FC-2/Bisphenol A/MEKO | 3/1/1/2/3 |
| FCU-39 | PAPI/FC-5/Bisphenol A/MEKO | 3/2/2/3 |

Emulsification of the Fluorochemical Polyurethanes

The fluorochemical polyurethanes were emulsified using different surfactants or mixtures of surfactants, following the general procedure as described for a mixture of Arquad 2HT-75 and Atpol E5721 surfactants.

Arquad 2HT-75 (3.5% based on fluorochemical polyurethane solids) was dissolved in a solution of the fluorochemical polyurethane. This solution was heated to 65° C. and subsequently added to an aqueous mixture of Atpol E5721 (3.5% of fluorochemical solids) in deionized water. This mixture was stirred vigorously for 5 minutes. The formed pre-emulsion was then emulsified by immersion of an ultrasound probe (Branson 250 Sonifier) for 3 minutes at maximum output. The ethylacetate was distilled off with a rotary evaporator at 55° C., using waterjet vacuum. An aqueous emulsion of about 20% solids was obtained. The emulsion thus formed was used to treat fabrics.

EXAMPLES 40–67

In the following Examples, fluorochemical polyurethane compositions were prepared according to the previously described general procedure. Except for Examples 53 and 67, the polyurethanes were emulsified in water using 7% Arquad 2HT75 emulsifier. Polyester microfiber and polyester/cotton blend were treated with the fluorochemical dispersions so as to give 0.3% SOF. After treatment, the fabrics were cured at 170° C. for 1.5 minutes. The fluorochemical polyurethane compositions evaluated and the results of oil and water repellency tests are given in Tables 3 and 4.

TABLE 3

Oil and Water Repellency of PES Treated with Fluorochemical Polyurethane Compositions

| Ex No. | FCU | Initial OR | Initial SR | Bundesmann 1' | Bundesmann 5' | Bundesmann 10' | Bundesmann % abs | 5HL air-dry OR | 5HL air-dry SR | 5HL air-dry % abs | 5HL Iron OR | 5HL Iron SR | 5DC OR | 5DC SR |
|---|---|---|---|---|---|---|---|---|---|---|---|---|---|---|
| 40 | FCU-1 | 5 | 100 | 5 | 5 | 4 | 6 | 1 | 70 | 9 | 1 | 100 | 5 | 100 |
| 41 | FCU-2 | 4 | 100 | 5 | 5 | 3 | 12 | 1 | 70 | 5 | 4 | 100 | 4 | 100 |
| 42 | FCU-3 | 4 | 100 | 5 | 5 | 5 | 6 | 1 | 70 | 6 | 3 | 100 | 2 | 100 |
| 43 | FCU-4 | 5 | 100 | 5 | 5 | 4 | 11 | 1 | 70 | 5 | 4 | 100 | 4 | 100 |
| 44 | FCU-6 | 5 | 100 | 5 | 5 | 4 | 12 | 1 | 70 | 8 | 4 | 100 | 4 | 100 |
| 45 | FCU-7 | 5 | 100 | 5 | 3 | 2 | 18 | 1 | 70 | 15 | 3 | 100 | 3 | 100 |
| 46 | FCU-8 | 2 | 100 | 5 | 2 | 1 | 21 | 0 | 0 | 9 | 2 | 100 | 2 | 100 |
| 47 | FCU-10 | 4 | 100 | 5 | 5 | 5 | 8 | 1 | 70 | i2 | 3 | 100 | 4 | 100 |
| 48 | FCU-11 | 5 | 100 | 5 | 5 | 5 | 6 | 1 | 80 | 9 | 4 | 100 | 4 | 100 |
| 49 | FCU-12 | 5 | 100 | 5 | 5 | 4 | 8 | 1 | 70 | 8 | 4 | 100 | 4 | 100 |
| 50 | FCU-14 | 4 | 90 | 1 | 1 | 1 | 21 | 2 | 70 | 6 | 3 | 90 | 4 | 90 |
| 51 | FCU-15 | 4 | 100 | 5 | 4 | 3 | 8 | 1 | 100 | 0 | 3 | 100 | 2 | 100 |
| 52 | FCU-17 | 6 | 100 | 3 | 2 | 2 | 15 | 3 | 80 | 1 | 5 | 100 | 6 | 100 |
| 53 | FCU-18 | 5 | 100 | 5 | 5 | 5 | 7 | 2 | 100 | 0 | 5 | 100 | 5 | 100 |

Note:
Example 53 was made by using a mixture of 3.5% Arquad 2HT 75 and 3.5% Atpol E5721 as surfactants.

TABLE 4

Oil and Water Repellency of PES/CO Treated with Fluorochemical Polyurethane Compositions

| Ex No. | FCU | Initial | | Bundesmann | | | | 5HL air-dry | | | 5HL Iron | | 5DC | |
|---|---|---|---|---|---|---|---|---|---|---|---|---|---|---|
| | | OR | SR | 1' | 5' | 10' | % abs | OR | SR | % abs | OR | SR | OR | SR |
| 54 | FCU-1  | 6 | 100 | 5 | 5 | 4 | 10 | 2 | 80  | 7 | 6 | 100 | 6 | 100 |
| 55 | FCU-2  | 6 | 100 | 5 | 3 | 2 | 17 | 3 | 90  | 2 | 6 | 100 | 6 | 100 |
| 56 | FCU-3  | 6 | 100 | 5 | 4 | 1 | 18 | 2 | 80  | 7 | 6 | 100 | 6 | 100 |
| 57 | FCU-4  | 6 | 100 | 5 | 4 | 3 | 18 | 3 | 90  | 3 | 6 | 100 | 6 | 100 |
| 58 | FCU-6  | 6 | 100 | 5 | 3 | 2 | 16 | 2 | 70  | 8 | 6 | 100 | 6 | 100 |
| 59 | FCU-7  | 6 | 100 | 5 | 3 | 2 | 18 | 2 | 70  | 9 | 6 | 100 | 5 | 100 |
| 60 | FCU-8  | 5 | 100 | 5 | 3 | 1 | 19 | 1 | 80  | 4 | 5 | 100 | 5 | 100 |
| 61 | FCU-10 | 6 | 100 | 5 | 4 | 3 | 14 | 2 | 80  | 8 | 6 | 100 | 6 | 100 |
| 62 | FCU-11 | 6 | 100 | 5 | 4 | 2 | 19 | 2 | 80  | 8 | 6 | 100 | 6 | 100 |
| 63 | FCU-12 | 6 | 100 | 5 | 4 | 3 | 13 | 2 | 80  | 5 | 6 | 100 | 6 | 100 |
| 64 | FCU-14 | 5 | 100 | 1 | 1 | 1 | 21 | 3 | 80  | 7 | 5 | 100 | 5 | 90  |
| 65 | FCU-15 | 6 | 100 | 5 | 4 | 4 | 9  | 2 | 100 | 2 | 6 | 100 | 5 | 100 |
| 66 | FCU-17 | 6 | 100 | 3 | 1 | 1 | 14 | 6 | 90  | 4 | 6 | 100 | 6 | 100 |
| 67 | FCU-18 | 7 | 100 | 5 | 4 | 3 | 16 | 6 | 100 | 3 | 7 | 100 | 7 | 100 |

Note:
Example 67 was made by using a mixture of 3.5% Arquad 2HT 75 and 3.5% Atpol E5721 as surfactants.

The data show that surprisingly, fluorochemical polyurethane compositions according to the invention show a real laundry air-dry effect. High water repeliency (at least a SR of 70, many times even 90 or 100 and low % water absorption) were observed even after 5 launderings without the need for ironing the dried samples.

EXAMPLES 68–78

In examples 68 to 78 the same kind of experiment described in Examples 40–67 was repeated with the fluorochemical polyurethanes tested in Tables 5 and 6. This time, the compositions, emulsified with 7% Arquad 2HT75 were tested on polyamide microfiber (0.3% SOF) and on cotton (0.6% SOF). The results of repellency after treatment are given in Tables 5 and 6.

TABLE 5

Oil and Water Repellency of PA Treated with Fluorochemical Polyurethane Compositions

| Ex No. | FCU | Initial | | Bundesmann | | | | 5HL air-dry | | | 5HL Iron | | 5DC | |
|---|---|---|---|---|---|---|---|---|---|---|---|---|---|---|
| | | OR | SR | 1' | 5' | 10' | % abs | OR | SR | % abs | OR | SR | OR | SR |
| 68 | FCU-27 | 7 | 100 | 5 | 5 | 4 | 9  | 2 | 80 | 8  | 6 | 100 | 6 | 100 |
| 69 | FCU-28 | 6 | 100 | 5 | 5 | 3 | 15 | 2 | 70 | 8  | 5 | 100 | 6 | 100 |
| 70 | FCU-29 | 6 | 100 | 5 | 3 | 3 | 20 | 1 | 70 | 14 | 3 | 100 | 3 | 100 |
| 71 | FCU-32 | 5 | 100 | 3 | 1 | 1 | 34 | 1 | 60 | 16 | 2 | 100 | 2 | 100 |
| 72 | FCU-33 | 6 | 100 | 5 | 5 | 3 | 23 | 1 | 70 | 20 | 5 | 100 | 5 | 100 |
| 73 | FCU-34 | 6 | 100 | 5 | 1 | 1 | 34 | 2 | 60 | 18 | 5 | 100 | 5 | 100 |

TABLE 6

Oil and Water Repellency of CO Treated with Fluorochemical Polyurethane Compositions

| Ex No. | FCU | Initial | | Bundesmann | | | | 5HL air-dry | | | 5HL Iron | | 5DC | |
|---|---|---|---|---|---|---|---|---|---|---|---|---|---|---|
| | | OR | SR | 1' | 5' | 10' | % abs | OR | SR | % abs | OR | SR | OR | SR |
| 74 | FCU-27 | 6 | 100 | 5 | 3 | 2 | 24 | 4 | 100 | 4  | 6 | 100 | 6 | 100 |
| 75 | FCU-28 | 6 | 100 | 5 | 4 | 3 | 23 | 4 | 90  | 5  | 6 | 100 | 6 | 100 |
| 76 | FCU-29 | 5 | 100 | 3 | 2 | 1 | 29 | 2 | 80  | 8  | 4 | 100 | 4 | 90  |
| 77 | FCU-33 | 6 | 100 | 2 | 1 | 1 | 29 | 0 | 70  | 17 | 5 | 90  | 5 | 90  |
| 78 | FCU-34 | 5 | 90  | 2 | 1 | 1 | 30 | 0 | 70  | 15 | 5 | 90  | 5 | 80  |

Again, good durable repellency properties were obtained, indicating that the fluorochemical polyurethanes had good repellency both on synthetic and on natural fibers.

EXAMPLES 79–84

Examples 79 to 84 illustrate the influence of the blocking or masking agent or repellency properties. In Examples 79, 81, and 83, an oxime blocking agent was used and in Examples 80, 82, and 84 a monofunctional alcohol was used. The fluorochemical polyurethanes were emulsified using 7% Arquad 2HT75. The results of repellency properties of various substrates treated with the composition are given in Table 7.

TABLE 7

Repellency Properties of Fabrics Treated with Fluorochemical Polyurethanes

| Ex No. | FCU No. | Initial OR | Initial SR | Bundesmann 1' | Bundesmann 5' | Bundesmann 10' | Bundesmann % abs | 5HL Iron OR | 5HL Iron SR | 5DC OR | 5DC SR |
|---|---|---|---|---|---|---|---|---|---|---|---|
| | | | | Polyester microfiber | | | | | | | |
| 79 | FCU-1 | 5 | 100 | 5 | 5 | 5 | 6 | 4 | 100 | 5 | 100 |
| 80 | FCU-35 | 5 | 100 | 5 | 5 | 4 | 10 | 5 | 100 | 5 | 90 |
| | | | | Polyamide microfiber | | | | | | | |
| 81 | FCU-1 | 6 | 100 | 4 | 2 | 1 | 33 | 5 | 100 | 6 | 100 |
| 82 | FCU-35 | 6 | 100 | 5 | 1 | 1 | 37 | 6 | 90 | 6 | 90 |
| | | | | PES/CO | | | | | | | |
| 83 | FCU-1 | 6 | 100 | 4 | 3 | 2 | 19 | 6 | 100 | 6 | 100 |
| 84 | FCU-35 | 6 | 100 | 2 | 1 | 1 | 20 | 6 | 80 | 6 | 80 |

The results indicate that compositions prepared from either an oxime or with a monofunctional alcohol as the blocking/masking agent provides good and durable water and oil repellency properties.

EXAMPLES 85–90

Examples 85 to 90 illustrate the influence of a siloxane chain extender. Siloxanes are known to impart softness to the treated fabric. However, in many cases, siloxanes have a negative impact on the repellency properties of the treatment. In Examples 85 to 90, fluorochemical polyurethanes were applied to PES, PA and to PES/CO. The hand or softness of the treated fabrics was evaluated by a panel of 8 persons. The average value is recorded in Table 8.

TABLE 8

Repellency Properties and Softness of Treated Fabrics

| Ex No. | FCU No. | Initial OR | Initial SR | Bundesmann 1' | Bundesmann 5' | Bundesmann 10' | Bundesmann % abs | 5HL Iron OR | 5HL Iron SR | 5DC OR | 5DC SR | Softness |
|---|---|---|---|---|---|---|---|---|---|---|---|---|
| | | | | Polyester microfiber | | | | | | | | |
| 85 | FCU-1 | 5 | 100 | 5 | 5 | 5 | 3 | 4 | 100 | 2 | 100 | 4 |
| 86 | FCU-36 | 3 | 100 | 5 | 5 | 4 | 5 | 2 | 100 | 3 | 100 | 7 |
| | | | | Polyamide microfiber | | | | | | | | |
| 87 | FCU-1 | 5 | 100 | 5 | 3 | 1 | 30 | 5 | 100 | 5 | 100 | 3 |
| 88 | FCU-36 | 4 | 100 | 5 | 3 | 2 | 31 | 4 | 100 | 4 | 100 | 8 |
| | | | | PES/CO | | | | | | | | |
| 89 | FCU-1 | 6 | 100 | 4 | 4 | 3 | 14 | 6 | 100 | 6 | 100 | 4 |
| 90 | FCU-36 | 6 | 100 | 4 | 2 | 1 | 17 | 5 | 100 | 5 | 90 | 8 |

Note:
The softness of the untreated fabrics was rated as follows: PES: 6; PA: 6 and PES/CO: 4.

The results indicate that, although a remarkable increase in softness was obtained by incorporating a siloxane chain extender, surprisingly, the repellent properties were not much influenced.

EXAMPLES 91–94

The same kind of experiment as that described in Examples 85 to 90 was repeated with fluorochemical polyurethanes that were prepared starting from other fluorochemical oligomers. The results are given in Table 9.

TABLE 9

Repellency Properties and Softness of Treated Fabrics

| Ex No. | FCU-No. | Initial | | Bundesmann | | | | 5HL air-dry | | | 5DC | | Softness |
|---|---|---|---|---|---|---|---|---|---|---|---|---|---|
| | | OR | SR | 1' | 5' | 10' | % abs | OR | SR | % abs | OR | SR | |
| PES/CO | | | | | | | | | | | | | |
| 91 | FCU-19 | 7 | 100 | 5 | 5 | 4 | 9 | 5 | 100 | 1 | 6 | 100 | 9 |
| 92 | FCU-20 | 6 | 100 | 5 | 5 | 5 | 8 | 2 | 100 | 1 | 5 | 100 | |
| Polyamide microfiber | | | | | | | | | | | | | |
| 93 | FCU-19 | 5 | 100 | 5 | 5 | 4 | 12 | 2 | 70 | 5 | — | — | 7 |
| 94 | FCU-20 | 4 | 100 | 5 | 5 | 3 | 13 | 1 | 70 | 6 | — | — | |

Note:
softness of untreated fabrics: PES/CO: 6; PA: 7.

The data shows that the addition of siloxane extender did not harm the oil and water repellency properties of the treatment compositions. The treated fabrics prepared for these examples not only had a very soft feeling, but also showed high repellency properties and a surprisingly high laundry air-dry performance.

EXAMPLES 95 to 98

In Examples 95 to 98, the influence of the fluorochemical monomer (used to make the fluorochemical polyurethane), on the performance of the treating agent was evaluated. Therefore, Example 95 was made starting from sulfonamido group containing fluorochemical monomer; Example 96 was made starting from telomer derived fluorochemical; in Example 97 a fluorochemical polyurethane was made starting from a mixture of fluorochemical oligomers and in Example 98 the fluorochemical oligomer was made starting from a mixture of sulfonamido type and telomer derived fluorochemical monomers. The treating compositions, emulsified with 7% Arquad 2HT75 were evaluated on PES. The results of repellency properties of the treated fabrics are given in Table 10.

TABLE 10

| Ex. No. | FCU-No. | Initial | | Bundesmann | | | | 5HL air-dry | | | 5HL Iron | | 5DC | |
|---|---|---|---|---|---|---|---|---|---|---|---|---|---|---|
| | | OR | SR | 1' | 5' | 10' | % abs | OR | SR | % abs | OR | SR | OR | SR |
| 95 | FCU-37 | 5 | 100 | 5 | 5 | 4 | 8 | 1 | 70 | 7 | 4 | 100 | 4 | 100 |
| 96 | FCU-27 | 6 | 100 | 5 | 5 | 5 | 5 | 3 | 100 | 0 | 5 | 100 | 5 | 100 |
| 97 | FCU-38 | 5 | 100 | 5 | 5 | 4 | 6 | 2 | 80 | 1 | 4 | 100 | 4 | 100 |
| 98 | FCU-39 | 5 | 100 | 5 | 4 | 3 | 10 | 2 | 80 | 2 | 4 | 100 | 4 | 100 |

The results indicate that the best performance, especially LAD, was obtained with telomer derived fluorochemical urethanes.

EXAMPLES 99 to 114

Examples 99 to 114 illustrate the influence of the surfactant system used to make a fluorochemical polyurethane dispersion on repellency properties. For this study, fluorochemical polyurethane FCU-1 (PAPI/FC-2/Arcol P1004/MEKO 3/2/2/3) was emulsified with different systems. The compositions were tested on PES/CO and on PES. A list of surfactants tested is given below. The results of repellency of the treated fabrics are given in Table 11.

Surfactants:

S1. 7% Arquad 2HT75
S2. 3.5% Arquad 2HT75+3.5% Atpol E5721
S3. 3.5% Arquad 2HT75+3.5% Silwet C90
S4. 7% Ethoquad HT25
S5. 7% Arquad T50
S6. 7% Rewopon IM-OA
S7. 7% Ethomeen HT25
S8. 7% Varine C.

TABLE 11

Influence of Surfactant System

| Ex No. | Sur-factant | Initial | | Bundesmann | | | | 5HL Iron | | 5DC | |
|---|---|---|---|---|---|---|---|---|---|---|---|
| | | OR | SR | 1' | 5' | 10' | % abs | OR | SR | OR | SR |
| 99 | S1 | 5 | 100 | 5 | 5 | 5 | 9 | 4 | 100 | 4 | 100 |
| 100 | S2 | 5 | 100 | 5 | 5 | 5 | 7 | 4 | 100 | 3 | 100 |
| 101 | S3 | 5 | 100 | 5 | 5 | 5 | 6 | 4 | 100 | 3 | 100 |

TABLE 11-continued

Influence of Surfactant System

| Ex No. | Sur-factant | Initial | | Bundesmann | | | | 5HL Iron | | 5DC | |
|---|---|---|---|---|---|---|---|---|---|---|---|
| | | OR | SR | 1' | 5' | 10' | % abs | OR | SR | OR | SR |
| 102 | S4 | 5 | 80 | 1 | 1 | 1 | 26 | 4 | 80 | 4 | 80 |
| 103 | S5 | 5 | 80 | 1 | 1 | 1 | 29 | 4 | 70 | 3 | 80 |
| 104 | S6 | 5 | 80 | 1 | 1 | 1 | 26 | 4 | 70 | 5 | 80 |
| 105 | S7 | 6 | 80 | 1 | 1 | 1 | 25 | 5 | 70 | 5 | 70 |
| 106 | S8 | 5 | 90 | 1 | 1 | 1 | 19 | 4 | 80 | 5 | 80 |

TABLE 11-continued

Influence of Surfactant System

| Ex No. | Sur- factant | Initial OR | SR | Bundesmann 1' | 5' | 10' | % abs | 5HL Iron OR | SR | 5DC OR | SR |
|---|---|---|---|---|---|---|---|---|---|---|---|
| | | | | PES/CO | | | | | | | |
| 107 | S1 | 6 | 100 | 4 | 3 | 2 | 19 | 6 | 100 | 6 | 100 |
| 108 | S2 | 6 | 100 | 3 | 1 | 1 | 20 | 6 | 100 | 6 | 80 |
| 109 | S3 | 6 | 100 | 3 | 2 | 1 | 19 | 6 | 90 | 6 | 90 |
| 110 | S4 | 6 | 90 | 1 | 1 | 1 | 23 | 6 | 80 | 6 | 80 |
| 111 | S5 | 6 | 80 | 1 | 1 | 1 | 29 | 6 | 70 | 6 | 70 |
| 112 | 56 | 6 | 80 | 1 | 1 | 1 | 27 | 6 | 70 | 6 | 70 |
| 99 | S1 | 5 | 100 | 5 | 5 | 5 | 9 | 4 | 100 | 4 | 100 |
| 100 | S2 | 5 | 100 | 5 | 5 | 5 | 7 | 4 | 100 | 3 | 100 |
| 101 | S3 | 5 | 100 | 5 | 5 | 5 | 6 | 4 | 100 | 3 | 100 |

TABLE 11-continued

Influence of Surfactant System

| Ex No. | Sur- factant | Initial OR | SR | Bundesmann 1' | 5' | 10' | % abs | 5HL Iron OR | SR | 5DC OR | SR |
|---|---|---|---|---|---|---|---|---|---|---|---|
| 102 | S4 | 5 | 80 | 1 | 1 | 1 | 26 | 4 | 80 | 4 | 80 |
| 103 | S5 | 5 | 80 | 1 | 1 | 1 | 29 | 4 | 70 | 3 | 80 |
| 104 | S6 | 5 | 80 | 1 | 1 | 1 | 26 | 4 | 70 | 5 | 80 |
| 105 | S7 | 6 | 80 | 1 | 1 | 1 | 25 | 5 | 70 | 5 | 70 |
| 106 | 58 | 5 | 90 | 1 | 1 | 1 | 19 | 4 | 80 | 5 | 80 |
| | | | | PES/CO | | | | | | | |
| 113 | S7 | 6 | 80 | 1 | 1 | 1 | 23 | 6 | 80 | 6 | 80 |
| 114 | S8 | 6 | 90 | 2 | 1 | 1 | 20 | 6 | 80 | 6 | 70 |

Surprisingly, the data shows that fluorochemical polyurethanes emulsified with ammonium surfactants having two long chain alkyl groups, such as Arquad 2HT75, had superior properties to fabrics treated with compositions prepared from the same fluorochemical polyurethanes and conventional emulsifiers known in the art. Not only initial repellency is better, but also the durability increased and laundry air-dry performance was better.

EXAMPLES 115 to 126

Examples 115 to 126 illustrate the influence of the cure temperature on the performance of the fluorochemical polyurethane treatments on different substrates (0.3% SOF). The fluorochemical polyurethane tested was FCU-19 (PAPI/FC-3/Wacker IM I 11 MEKO 3/2/2/3). After treatment, the substrates were cured for 1.5 minutes at different temperatures between 90° C. and 150° C. The results are given in Table 12.

TABLE 12

Influence of Curing Temperature on Repellent Performance

| Ex No. | FCU | Cure Temp | Initial OR | SR | Bundesmann 1' | 5' | 10' | % abs | 5HL Iron OR | SR | 5DC OR | SR |
|---|---|---|---|---|---|---|---|---|---|---|---|---|
| | | | | | PES/CO | | | | | | | |
| 115 | FCU-19 | 90 | 5 | 70 | 1 | 1 | 1 | / | 5 | 80 | 5 | 80 |
| 116 | | 110 | 6 | 80 | 1 | 1 | 1 | 32 | 5 | 80 | 5 | 80 |
| 117 | | 130 | 6 | 100 | 4 | 3 | 2 | 16 | 5 | 90 | 5 | 90 |
| 118 | | 150 | 6 | 100 | 4 | 3 | 2 | 12 | 5 | 90 | 6 | 90 |
| | | | | | Polyamide microfiber | | | | | | | |
| 119 | FCU-19 | 90 | 2 | 80 | 1 | 1 | 1 | / | 2 | 80 | 2 | 80 |
| 120 | | 110 | 4 | 90 | 2 | 1 | 1 | 36 | 2 | 80 | 3 | 90 |
| 121 | | 130 | 4 | 100 | 5 | 4 | 3 | 20 | 2 | 90 | 4 | 90 |
| 122 | | 150 | 4 | 100 | 4 | 4 | 3 | 28 | 3 | 90 | 4 | 90 |
| | | | | | Polyester microfiber | | | | | | | |
| 123 | FCU-19 | 90 | 4 | 100 | 5 | 5 | 5 | 10 | 3 | 90 | 3 | 80 |
| 124 | | 110 | 5 | 100 | 5 | 5 | 5 | 8 | 3 | 100 | 3 | 80 |
| 125 | | 130 | 5 | 100 | 5 | 5 | 5 | 3 | 4 | 100 | 3 | 90 |
| 126 | | 150 | 5 | 100 | 5 | 5 | 5 | 7 | 4 | 100 | 3 | 100 |

Note:
/ = has not been measured, were completely wet.

EXAMPLES 127 to 130

Examples 127 to 130 illustrate the ability of fabrics treated with the composition of this invention to withstand a home spot cleaning test. Fluorochemical polyurethane FCU-1 (PAPI/FC-2/Arcol P1004/MEKO) and FCU-19 (PAPI/FC-3/Wacker IM11/MEKO) were used to treat cotton and upholstery acrylic awning. The fluorochemical polyurethanes were applied at 0.4% SOF. Curing was done at 150° C. during 3 minutes. The performance tests were done before and after spot cleaning test. The results are given in Table 13.

TABLE 13

Resistance of Treated Fabrics Against Spot Cleaning Test

| Ex No. | FCU- No. | Oil Repellency (OR) | | Spray Rating (SR) | |
|---|---|---|---|---|---|
| | | Initial | Spot Clean | Initial | Spot Clean |
| Acrylic awning | | | | | |
| 127 | FCU-1 | 5 | 100 | 4 | 80 |
| 128 | FCU-19 | 6 | 100 | 5 | 90 |
| Upholstery Cotton | | | | | |
| 129 | FCU-1 | 5 | 90 | 3 | 90 |
| 130 | FCU-19 | 6 | 100 | 4 | 100 |

The results indicate that even after spot cleaning, high performance is still provided.

Various modifications and alterations of this invention will become apparent to those skilled in the art without departing from the scope and spirit of this invention, and it should be understood that this invention is not to be unduly limited to the illustrative embodiments set forth herein.

We claim:

1. A fluorochemical composition derived from the reaction of the following compounds:
   (a) at least one fluorochemical oligomer represented by the formula:

$$M^f_m M^h_l TH$$

wherein:
   $M^f$ is an organic residue derived from a fluorochemical monomer and such residues may be the same or different,
   $M^h$ is an organic residue derived from a fluorine-free monomer and such residues may be the same or different,
   m is a number from 2 to 40, inclusive,
   l is a number from 0 to 20, inclusive,
   T is an organic linking group obtained by removing a hydrogen atom from a chain transfer agent that contains only two functional groups selected from the group consisting of hydroxy, amino and mercapto functional groups;
   (b) At least one isocyanate represented by the formula:

$$A(NCO)_x$$

wherein:
   A is an organic, di-, tri- or tetravalent residue; and
   X is a number from 2 to 4, inclusive;
   (c) at least one bifunctional, active hydrogen compound represented by the formula:

$$HX\text{-}B\text{-}XH$$

wherein:
   B is a divalent organic residue, and
   X is O, NH or S; and
   (d) at least one isocyanate masking agent.

2. A fluorochemical composition according to claim 1, wherein $M^f$ is derived from monomers selected from the group consisting of fluorochemical acrylates, m nethacrylates and vinyl ethers.

3. A fluorochemical composition according to claim 2, wherein the fluorochemical acrylates and methacrylates are derived from fluorochemical telomer alcohols or fluorochemical carboxylic acids.

4. A fluorochemical composition according to claim 1, wherein $M^f$ is derived from fluorochemical monomer selected from the group consisting of:

$$CF_3(CF_2)_4CH_2OCOC(CH_3)=CH_2$$

$$CF_3(CF_2)_6(CH_2)_2OCOC(CH_3)=CH_2$$

$$CF_3(CF_2)_6(CH_2)_2OCOCH=CH_2$$

$$CF_3(CF_2)_6CH_2OCOC(CH_3)=CH_2$$

$$CF_3(CF_2)_6CH_2OCOCH=CH_2$$

$$CF_3(CF_2)_7(CH_2)_2OCOCH=CH_2$$

$$CF_3(CF_2)_7SO_2N(R)(CH_2)_2OCOCH=CH_2$$

$$CF_3CF_2(CF_2CF_2)_8CH_2CH_2OCOCH=CH_2$$

$$CF_3(CF_2)_7SO_2N(R)(CH_2)_2OCOC(CH_3)=CH_2$$

$$CF_3(CF_2)_7CH_2CH_2SO_2N(CH_3)CH_2CH_2OCOC(CH_3)=CH_2$$

wherein, R is a moiety selected from the group consisting of methyl or ethyl groups and s is a number from 2 to 8, inclusive.

5. A fluorochemical composition according to claim 1, wherein $M^f$ is derived from a fluorochemical monomer according to the formula:

$$R_f\text{-}[SO_2\text{-}N(R)]_r\text{-}(CH_2)_s\text{-}D$$

wherein:
$R_f$ is $C_nF_{2n+1}$ and n is a number from 3 to 18, inclusive;
r is 0 or 1;
s is a number from I to 8, inclusive;
D is a group comprising a radically polymerizable unsaturated residue; and
R is methyl or ethyl.

6. A fluorochemical composition according to claim 5, wherein n is a number from 6 to 12, inclusive, and s is 1 or 2.

7. A fluorochemical composition according to claim 1, wherein not all the A residues are difunctional.

8. A fluorochemical composition according to claim 1, wherein more than 90% of the A residues are trifunctional.

9. A fluorochemical composition according to claim 1, wherein the B residue comprises siloxane groups.

10. A fluorochemical composition according to claim 1, wherein the T group is obtained from chain transfer agents selected from the group consisting of 2-mercaptoethanol, 3-mercapto-2-butanol, 3-mercapto-2-propanol, 3-mercapto-propanol, 3-mercapto-1,2-propanediol, 2,3-dimercaptopropanol, 2-mercapto-ethylamine and 2-mercaptoethylsulfide.

11. A fluorochemical composition according to claim 1, wherein the T group is obtained from 2-mercaptoethanol.

12. A fluorochemical composition according to claim 1, wherein the difunctional active hydrogen compound is selected from the group consisting of difunctional alcohols, difunctional thiols and difunctional amines.

13. A fluorochemical composition according to claim 1, wherein the difunctional active hydrogen compound is selected from the group consisting of 1,4-butanediol, 1,6-hexanediol, 1,10-decanediol, 4,4'-isopropylidene diphenol, polyester diols, fatty acid dimer diols, poly(oxyalkylene) diols having oxyalkylene groups with 2 to 4 carbon atoms and hydroxy functional polydimethylsiloxanes.

14. A fluorochemical composition according to claim 1, wherein the isocyanate masking agent is selected from the group consisting of methanol, ethanol, n-propyl alcohol, isopropyl alcohol, n-butyl alcohol, isobutyl alcohol, t-butyl alcohol, n-amyl alcohol, t-amyl alcohol, 2-ethylhexanol, glycidol, (iso)stearyl alcohol, aryl alcohols, $C_2$ to $C_8$ alkanone oximes, benzophenone oxime, aryl-thiols, organic carbanion active hydrogen compounds, epsilon-caprolactone, primary amines, secondary amines, hydroxylamine, primary amino mercaptans and secondary amino mercaptans.

15. A fluorochemical composition according to claim 1, wherein the isocyanate masking agent is selected from the group consisting of 2-butanone oxime, 2-ethylhexanol and (iso)stearyl alcohol.

16. A fluorochemical composition according to claim 1, wherein
(a) the fluorochemical oligomer is derived from fluorochemical monomer according to the formula:

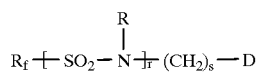

wherein:
$R_f$ is $C_nF_{2n+1}$ and n is a number from 3 to 18, inclusive;
r is 0 or 1;
s is a number from 2 to 8, inclusive;
D is a group comprising a radically polymerizable unsaturated residue; and
R is methyl or ethyl;
(b) the isocyanate is polymethylene-polyphenyl-isocyanate;
(c) the bifunctional active hydrogen compound is selected from the group consisting of 4,4'-isopropylidene diphenol, poly(oxy)alkylenediols having $C_2$ to $C_4$ oxyalkylene groups, hydroxy functional polydimethylsiloxanes, and mixtures thereof and
(d) the isocyanate masking agent is 2-butanone oxime.

17. A fluorochemical composition according to claim 1, wherein the fluorochemical oligomer is derived from at least one fluorochemical monomer according to the formula:

$C_nF_{2n+1}CH_2CH_2OC(O)CH=CH_2$ wherein n is 3 to 18, inclusive.

18. A method of preparing a fluorochemical composition according to claim 1, comprising the step of reacting:
(a) at least one of the fluorochemical oligomers,
(b) at least one of the isocyanates,
(c) at least one of the bifunctional active hydrogen compounds, and
(d) at least one compound of the isocyanate masking agents.

19. A durable oil- and water-repellency composition comprising the fluorochemical composition according to claim 1.

20. A durable oil- and water-repellency composition comprising the fluorochemical composition according to claim 2.

21. A durable oil- and water-repellency composition comprising the fluorochemical composition according to claim 3.

22. A durable oil- and water-repellency composition comprising the fluorochemical composition according to claim 4.

23. A durable oil- and water-repellency composition comprising the fluorochemical composition according to claim 5.

24. A durable oil- and water-repellency composition comprising the fluorochemical composition according to claim 6.

25. A durable oil- and water-repellency composition comprising the fluorochemical composition according to claim 7.

26. A durable oil- and water-repellency composition comprising the fluorochemical composition according to claim 8.

27. A durable oil- and water-repellency composition comprising the fluorochemical composition according to claim 9.

28. A durable oil- and water-repellency composition comprising the fluorochemical composition according to claim 10.

29. A durable oil- and water-repellency composition comprising the fluorochemical composition according to claim 11.

30. A durable oil- and water-repellency composition comprising the fluorochemical composition according to claim 12.

31. A durable oil- and water-repellency composition comprising the fluorochemical composition according to claim 13.

32. A durable oil- and water-repellency composition comprising the fluorochemical composition according to claim 14.

33. A durable oil- and water-repellency composition comprising the fluorochemical composition according to claim 15.

34. A durable oil- and water-repellency composition comprising the fluorochemical composition according to claim 16.

35. A durable oil- and water-repellency composition comprising the fluorochemical composition according to claim 17.

36. A composition according to claim 19, further comprising at least one surfactant represented by the following formula:

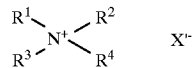

wherein:
$R^1$ and $R^2$ are long chain alkyl groups having at least eight carbon atoms that may be independently selected;
$R^3$ and $R^4$ are short chain alkyl groups having from 1 to 8 carbon atoms or hydrogen and may be independently selected; and
$X'^-$ is an anion selected from the group consisting of $Cl^-$, $Br^-$, $I^-$, $HSO_4^{31}$ and $CH_3COO^-$.

37. A composition according to claim 20, further comprising at least one surfactant represented by the following formula:

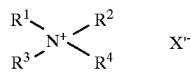

wherein:

$R^1$ and $R^2$ are long chain alkyl groups having at least eight carbon atoms that may be independently selected;

$R^3$ and $R^4$ are short chain alkyl groups having from 1 to 8 carbon atoms or hydrogen and may be Independently selected; and $X^{I-}$ is an anion selected from the group consisting of $Cl^-$, $Br^-$, $I^-$, $HSO_4^-$ and $CH_3COO$.

38. A composition according to claim 21, further comprising at least one surfactant represented by the following formula:

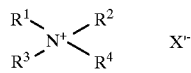

wherein:

$R^1$ and $R^2$ are long chain alkyl groups having at least eight carbon atoms that may be independently selected;

$R^3$ and $R^4$ are short chain alkyl groups having from 1 to 8 carbon atoms or hydrogen and may be independently selected; and $X^{I-}$ is an anion selected from the group consisting of $Cl^{31}$, $Br^-$, $I^-$, $HSO_4^-$ and $CH_3COO^-$.

39. A composition according to claim 26, further comprising at least one surfactant represented by the following formula:

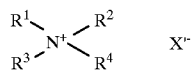

wherein:

$R^1$ and $R^2$ are long chain alkyl groups having at least eight carbon atoms that may be independently selected;

$R^3$ and $R^4$ are short chain alkyl groups having from 1 to 8 carbon atoms or hydrogen and may be independently selected; and $X^{I-}$ is an anion selected from the group consisting of $Cl^-$, $Br^-$, $I^-$, $HSO_4^-$ and $CH_3COO^-$.

40. A composition according to claim 24, further comprising at least one surfactant represented by the following formula:

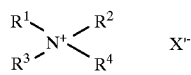

wherein:

$R^1$ and $R^2$ are long chain alkyl groups having at least eight carbon atoms that may be independently selected;

$R^3$ and $R^4$ are short chain alkyl groups having from 1 to 8 carbon atoms or hydrogen and may be independently selected; and $X^{I-}$ is an anion selected from the group consisting of $Cl^-$, $Br^-$, $I^-$, $HSO_4^-$ and $CH_3COO^-$.

41. A composition according to claim 30, further comprising at least one surfactant represented by the following formula:

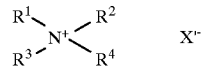

wherein:

$R^1$ and $R^2$ are long chain alkyl groups having at least eight carbon atoms that may be independently selected;

$R^3$ and $R^4$ are short chain alkyl groups having from 1 to 8 carbon atoms or hydrogen and may be independently selected; and $X^{I-}$ is an anion selected from the group consisting of $Cl^-$, $Br^-$, $I^-$, $HSO_4^-$ and $CH_3COO$.

42. A composition according to claim 31, further comprising at least one surfactant represented by the following formula:

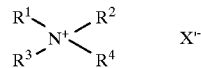

wherein:

$R^1$ and $R^2$ are long chain alkyl groups having at least eight carbon atoms that may be independently selected;

$R^3$ and $R^4$ are short chain alkyl groups having from 1 to 8 carbon atoms or hydrogen and may be independently selected; and $X^{'31}$ is an anion selected from the group consisting of $Cl^-$, $Br^-$, $I^-$, $HSO_4^-$ and $CH_3COO$.

43. A composition according to claim 32, further comprising at least one surfactant represented by the following formula:

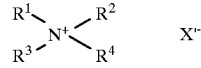

wherein:

$R^1$ and $R^2$ are long chain alkyl groups having at least eight carbon atoms that may be independently selected;

$R^3$ and $R^4$ are short chain alkyl groups having from 1 to 8 carbon atoms or hydrogen and may be independently selected; and $X^{I-}$ is an anion selected from the group consisting of $Cl^-$, $Br^-$, $I^-$, $HSO_4^-$ and $CH_3COO^-$.

44. A composition according to claim 34, further comprising at least one surfactant represented by the following formula:

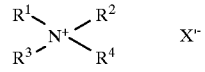

wherein:

$R^1$ and $R^2$ are long chain alkyl groups having at least eight carbon atoms that may be independently selected;

$R^3$ and $R^4$ are short chain alkyl groups having from 1 to 8 carbon atoms or hydrogen and may be independently selected; and $X^{I-}$ is an anion selected from the group consisting of $Cl^-$, $Br^-$, $I^-$, $HSO_4^-$ and $CH_3COO^-$.

45. A composition according to claim 35, further comprising at least one surfactant represented by the following formula:

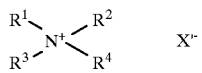

wherein:
R$^1$ and R$^2$ are long chain alkyl groups having at least eight carbon atoms that may be independently selected;
R$^3$ and R$^4$ are short chain alkyl groups having from 1 to 8 carbon atoms or hydrogen and may be independently selected; and
X$^-$ is an anion selected from the group consisting of Cl$^-$, Br$^-$, I$^-$, HSO$_4^-$ and CH$_3$COO$^-$.

46. A composition according to claim 19, wherein for each 100 parts by weight of the fluorochemical composition, the composition further comprises:
   (a) about 70 to 20,000 parts by weight of water, and
   (b) about 1 to 25 parts by weight of surfactant.

47. A composition according to claim 20, wherein for each 100 parts by weight of the fluorochemical composition, the composition further comprises:
   (a) about 70 to 20,000 parts by weight of water, and
   (b) about 1 to 25 parts by weight of surfactant.

48. A composition according to claim 21, wherein for each 100 parts by weight of the fluorochemical composition, the composition further comprises:
   (a) about 70 to 20,000 parts by weight of water, and
   (b) about 1 to 25 parts by weight of surfactant.

49. A composition according to claim 26, wherein for each 100 parts by weight of the fluorochemical composition, the composition further comprises:
   (a) about 70 to 20,000 parts by weight of water, and
   (b) about 1 to 25 parts by weight of surfactant.

50. A composition according to claim 27, wherein for each 100 parts by weight of the fluorochemical composition, the composition further comprises:
   (a) about 70 to 20,000 parts by weight of water, and
   (b) about 1 to 25 parts by weight of surfactant.

51. A composition according to claim 30, wherein for each 100 parts by weight of the fluorochemical composition, the composition further comprises:
   (a). about 70 to 20,000 parts by weight of water, and
   (b) about 1 to 25 parts by weight of surfactant.

52. A composition according to claim 31, wherein for each 100 parts by weight of the fluorochemical composition, the composition further comprises:
   (a) about 70 to 20,000 parts by weight of water, and
   (b) about 1 to 25 parts by weight of surfactant.

53. A composition according to claim 32, wherein for each 100 parts by weight of the fluorochemical composition, the composition further comprises:
   (a) about 70 to 20,000 parts by weight of water, and
   (b) about 1 to 25 parts by weight of surfactant.

54. A composition according to claim 32, wherein for each 100 parts by weight of the fluorochemical composition, the composition further comprises
   (a) about 70 to 20,000 parts by weight of water, and
   (b) about 1 to 25 parts by weight of surfactant.

55. A composition according to claim 35, wherein for each 100 parts by weight of the fluorochemical composition, the composition further comprises:
   (a) about 70 to 20,000 parts by weight of water, and
   (b) about 1 to 25 parts by weight of surfactant.

56. A method of imparting durable oil- and water-repellency to a substrate, comprising the steps:
   (a) applying to a surface of a substrate an effective amount of the fluorochemical composition according to claim 19, and
   (b) heating the treated substrate at a temperature and for a time sufficient to cure the treated substrate to the desired level of cure.

57. The method according to claim 56, wherein the substrate is selected from the group consisting of fibers, woven or non-woven fabrics, carpets, leather and paper.

58. A method of imparting durable oil- and water-repellency to a substrate, comprising the steps:
   (a) applying to a surface of a substrate an effective amount of the fluorochemical composition according to claim 36, and
   (b) heating the treated substrate at a temperature and for a time sufficient to cure the treated substrate to the desired level of cure.

59. The method according to claim 58, wherein the substrate is selected from the group consisting of fibers, woven or non-woven fabrics, carpets, leather and paper.

60. A substrate comprising on at least one surface the fluorochemical composition of claim 1.

61. A substrate according to claim 60, wherein the substrate is selected from the group consisting of fibers, woven fabrics, non-woven fabrics, carpet, leather and paper.

* * * * *

UNITED STATES PATENT AND TRADEMARK OFFICE
CERTIFICATE OF CORRECTION

PATENT NO. : 5,910,557

DATED : June 8, 1999

INVENTOR(S) : Frans A. Audenaert, Kaprijke, Kathy E.M.L.A. Allewaert, Haacht; Gert Hooftman, Tielrode, all of Belgium; Makoto Nagase, Tokyo, Japan; Hugo R. Lens, Boechout, Belgium It is certified that error appears in the above-identified patent and that said Letters Patent is hereby corrected as shown below:

In column 3, line 7 "chiloride" should be -- chloride --

In column 3, line 9 "akloxy(meth)acrylates" should be -- alkyloxy(meth)acrylates --

In column 6, line 49 "carboxyarnido" should be -- carboxyamido --

In column 8, line 8 "acrylanide" should be -- acrylamide --

In column 8, line 11 "methyistyrene" should be -- methylstyrene --

In column 8, line 15 "dichiorobutadiene" should be -- dichlorobutadiene --

In column 8, line 23 "vinyciloride" should be -- vinylchloride --

In column 9, line 35 "chliorophenol" should be -- chlorophenol --

In column 10, line 16 "$R_1$ and $R^3$" should be -- $R^1$ and $R^2$ --

In column 10, line 21 "(Cl-,Br$^{-1}$)" should be --(Cl$^-$,Br$^-$,I$^-$) --

In column 13, line 42 "FCA" should be -- FOA --

In column 23, Table 11-continued, the surfactant should be -- 56 -- instead of "S6".

In column 24, line 16 "IM I 11 MEKO should be -- IM 11/MEKO

In column 25, line 62 and 63, "m nethacylates" should be -- methacrylates --

UNITED STATES PATENT AND TRADEMARK OFFICE
CERTIFICATE OF CORRECTION

PATENT NO. : 5,910,557

DATED : June 8, 1999

INVENTOR(S) : Frans A. Audenaert, Kaprijke, Kathy E.M.L.A. Allewaert, Haacht; Gert Hooftman, Tielrode, all of Belgium; Makoto Nagase, Tokyo, Japan; Hugo R. Lens, Boechout, Belgium It is certified that error appears in the above-identified patent and that said Letters Patent is hereby corrected as shown below:

In column 26, line 24, "l" should be -- 1 --

In column 26, line 58 and 59, "3-mercapto-propanol" should be -- 3-mercapto-1-propanol In column 27, line 6, "diois" should be -- diols --

In column 28, line 38, "repeliency" should be -- repellency --

In column 28, line 64, "BR$^-$,I$^-$,HSO$_4^{31}$" should be -- BR$^-$,I$^-$,HSO$_4^-$ --

In column 29, line 15, "CH$_3$COO" should be -- CH$_3$COO$^-$ --

In column 29, line 50, "claim 24" should be -- claim 27 --

In column 30, line 17, "CH$_3$COO" should be -- CH$_3$COO$^-$ --

In column 30, line 33, "X$^{'31}$" should be -- X$^-$ --

In column 30, line 34, "CH$_3$COO" should be -- CH$_3$COO$^-$ --

In column 31, line 15, "X$^{31}$" should be -- X$^-$ --

In column 31, line 16 "$_{Br}^-$,I$^-$,HSO$_4^{31}$" should be Br$^-$,I$^-$,HSO$_4^-$ --

UNITED STATES PATENT AND TRADEMARK OFFICE
CERTIFICATE OF CORRECTION

PATENT NO. : 5,910,557
DATED : June 8, 1999
INVENTOR(S) : Frans A. Audenaert, Kaprijke, Kathy E.M.L.A. Allewaert, Haacht; Gert Hooftman, Tielrode, all of Belgium; Makoto Nagase, Tokyo, Japan; Hugo R. Lens, Boechout, Belgium It is certified that error appears in the above-identified patent and that said Letters Patent is hereby corrected as shown below:

In column 32, line 54, "claim 32" should be -- claim 34 --

Signed and Sealed this

Twenty-second Day of February, 2000

Attest:

Q. TODD DICKINSON

Attesting Officer                Commissioner of Patents and Trademarks